(12) United States Patent
Wang (10) Patent No.: US 11,231,790 B2
(45) Date of Patent: Jan. 25, 2022

(54) PROJECTION SCREEN, IMAGE SYNTHESIZING DEVICE, PROJECTION SYSTEM AND RELATED METHODS

(71) Applicant: BOE Technology Group Co., Ltd., Beijing (CN)

(72) Inventor: Yongbo Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 373 days.

(21) Appl. No.: 16/328,518

(22) PCT Filed: May 22, 2018

(86) PCT No.: PCT/CN2018/087888
§ 371 (c)(1),
(2) Date: Feb. 26, 2019

(87) PCT Pub. No.: WO2018/223838
PCT Pub. Date: Dec. 13, 2018

(65) Prior Publication Data
US 2021/0200333 A1 Jul. 1, 2021

(30) Foreign Application Priority Data
Jun. 5, 2017 (CN) .......................... 201710414725.9

(51) Int. Cl.
*G09G 5/08* (2006.01)
*G06F 3/03* (2006.01)
(Continued)

(52) U.S. Cl.
CPC ........... *G06F 3/0325* (2013.01); *G03B 21/56* (2013.01); *G06F 3/03542* (2013.01); *G06T 11/60* (2013.01); *G09G 3/001* (2013.01)

(58) Field of Classification Search
CPC ... G06F 3/0325; G06F 3/03542; G03B 21/56; G06T 11/60; G09G 3/001
(Continued)

(56) References Cited

U.S. PATENT DOCUMENTS

2010/0259476 A1 10/2010 Li
2011/0057879 A1* 3/2011 Pan .................. G09G 3/001
345/158
(Continued)

FOREIGN PATENT DOCUMENTS

CN 101859192 A 10/2010
CN 103376894 A 10/2013
(Continued)

OTHER PUBLICATIONS

Office Action for corresponding Chinese Application 201710414725.9 dated May 24, 2019.
(Continued)

*Primary Examiner* — Abdul-Samad A Adediran
(74) *Attorney, Agent, or Firm* — Arent Fox LLP; Michael Fainberg (57) ABSTRACT

A projection screen, an image synthesis apparatus, a projection system and a related method are disclosed. The projection screen comprises a curtain, and further comprises a photosensitive element, wherein the photosensitive element is arranged on the curtain and is used for generating a position sensing signal; and a signal processing circuit, wherein the signal processing circuit is used for determining relative position coordinates, in a projection area, of an indication point and outputting same, wherein the projection area is an area, on the projection screen, for receiving illumination of an optical projection device, and the indication point is a projection point, on the projection screen, of an optical indication device.

18 Claims, 7 Drawing Sheets

(51) Int. Cl.
  *G03B 21/56* (2006.01)
  *G06T 11/60* (2006.01)
  *G09G 3/00* (2006.01)
  *G06F 3/0354* (2013.01)

(58) Field of Classification Search
  USPC .................................................. 345/157, 158
  See application file for complete search history.

(56) References Cited

U.S. PATENT DOCUMENTS

2012/0212412 A1* 8/2012 Mizuno ............... G06F 3/03542
                                                345/157
2016/0034183 A1   2/2016 Li et al.

FOREIGN PATENT DOCUMENTS

| CN | 103777451 A | 5/2014 |
| CN | 104156074 A | 11/2014 |
| CN | 106201289 A | 12/2016 |
| CN | 107132987 A | 9/2017 |

OTHER PUBLICATIONS

International Search Report for PCT/CN2018/087888 dated Aug. 28, 2018.
Office Action for corresponding Chinese Application 201710414725.9 dated Mar. 13, 2019.

* cited by examiner

PROJECTION SCREEN, IMAGE SYNTHESIZING DEVICE, PROJECTION SYSTEM AND RELATED METHODS

CROSS-REFERENCE TO RELATED APPLICATION

This application is a National Stage of International Application No. PCT/CN2018/087888, filed May 22, 2018, which claims priority to Chinese Patent Application No. 201710414725.9, filed Jun. 5, 2017, both of which are hereby incorporated by reference in their entireties.

FIELD

This disclosure relates to the field of image display technologies, and particularly to a projection screen, an image synthesizing device, a projection system and related methods.

BACKGROUND

At present, in big speeches or in multi-class simultaneous teaching activities, multiple presentation screens are usually required at the same time. When a speaker uses a light indicating device (such as a laser pointer) to indicate a position on a nearby screen, the position of a main point indicated by the speaker cannot be seen from other screens, resulting in poor interaction during speech giving or teaching.

A general solution to this problem currently is for the speaker to return to the position of a computer and display the main point to be explained by operating a mouse, which leads to a decline in the quality of speech giving or teaching and reduces the interaction between the speaker and the audience. In addition, using a camera to record all the videos makes a system more complex and reduces the real-time performance and interactivity.

SUMMARY

Some embodiments of the disclosure provide a projection screen, including: a screen curtain; photosensitive elements, positioned on the screen curtain and configured to generate position sensing signals; and a signal processing circuit, electrically connected with the photosensitive elements and configured to determine and output a relative position coordinate of an indication point in a projection area; wherein the projection area is an area, illuminated by a light projection device, on the projection screen; and the indication point is a projection point of a light indication device on the projection screen.

Optionally, the signal processing circuit includes a projection area identification circuit, and the projection area identification circuit is configured to identify an area, where a photosensitive element illuminated by the light projection device to generate a position sensing signal is located, as the projection area.

Optionally, the projection area identification circuit includes a first capturing component and a first image identification component; the first capturing component is configured to capture the projection screen to obtain a projection screen picture; and the first image identification component is configured to identify a position corresponding to the projection area in the projection screen picture.

Optionally, the signal processing circuit further includes an indication point identification circuit, and the indication point identification circuit is configured to identify a change of electrical signals output by the photosensitive elements and identify a position of a photosensitive element on the projection screen with a light intensity value greater than a preset light intensity value as an absolute position of the indication point on the projection screen.

Optionally, the indication point identification circuit includes a second capturing component and a second image identification component; the second capturing component is configured to capture the projection screen to obtain a projection screen picture; and the second image identification component is configured to identify a position in the projection screen picture with a brightness value greater than a preset brightness value as an absolute position of the indication point on the projection screen.

Optionally, the signal processing circuit further includes a relative position coordinate calculation circuit, and the relative position coordinate calculation circuit is configured to calculate the relative position coordinate of the indication point in the projection area according to the absolute position of the indication point and a position of the projection area.

Optionally, the relative position coordinate calculation circuit is configured to calculate the relative position coordinate of the indication point in the projection area by numbering the photosensitive elements.

Optionally, the relative position coordinate calculation circuit is configured to determine the relative position coordinate of the indication point in the projection area by calculating a positional proportional relationship of the indication point in the projection area.

Optionally, silica gel layers are further provided, and the silica gel layers are located between the photosensitive elements and the screen curtain.

Optionally, an insulating light-transmitting film which is located at the same film layer as the silica gel layers is further provided, and the insulating light-transmitting film is located among the silica gel layers.

Some embodiments of the disclosure provide an image synthesizing device, including: a coordinate acquisition circuit configured to acquire a relative position coordinate, in a demonstration image area, of an indication point for indication in the demonstration image area; a coordinate mapping circuit configured to map the relative position coordinate of the indication point in the demonstration image area to a mark pattern coordinate in a demonstration image projected in the demonstration image area; and a synthesizing circuit configured to generate a mark pattern at a mapped coordinates in the demonstration image.

Optionally, a mark adjustment circuit is further provided, and the mark adjustment circuit is configured to adjust a shape, a color and/or a size of the mark pattern as needed.

Some embodiments of the disclosure provide a projection system including the projection screen described above and an image synthesizing device. The signal processing circuit in the projection screen is configured to output the relative position coordinate of the indication point in the projection area to the image synthesizing device. The image synthesizing device includes: a coordinate acquisition circuit configured to acquire a relative position coordinate, in a demonstration image area, of the indication point for indication in the demonstration image area; a coordinate mapping circuit configured to map the relative position coordinate of the indication point in the demonstration image area to a mark pattern coordinate in a demonstration image projected in the demonstration image area; and a synthesizing circuit configured to generate a mark pattern at a mapped coordinates in the demonstration image.

Some embodiments of the disclosure provide a projection system including the image synthesizing device described above and a projection screen. The projection screen includes: a screen curtain; photosensitive elements, positioned on the screen curtain and configured to generate position sensing signals; and a signal processing circuit, electrically connected with the photosensitive elements and configured to determine a relative position coordinate of an indication point in a projection area and output the same to the image synthesizing device; where the projection area is an area, illuminated by a light projection device, on the projection screen; and the indication point is a projection point of a light indication device on the projection screen.

Some embodiments of the disclosure provide a coordinate determining method, including: determining an area, illuminated by a light projection device, on a projection screen as a projection area; determining a projection point position of a light indication device on the projection screen as an absolute position of an indication point on the projection screen; determining a relative position coordinate of the indication point in the projection area; and outputting the relative position coordinate.

Some embodiments of the disclosure provide an image synthesizing method, including: acquiring a position coordinate, in a demonstration image area, of an indication point for indication in the demonstration image area; mapping the position coordinate of the indication point in the demonstration image area to a mark pattern coordinate in a demonstration image projected in the demonstration image area; and generating a mark pattern at a mapped coordinates in the demonstration image.

Some embodiments of the disclosure provide a projection method, including: determining an area, illuminated by a light projection device, on a projection screen as a projection area; determining a projection point position of a light indication device on the projection screen as an absolute position of an indication point on the projection screen; determining a relative position coordinate of the indication point in the projection area; outputting the relative position coordinate; acquiring a position coordinate, in a demonstration image area, of the indication point for indication in the demonstration image area; mapping the position coordinate of the indication point in the demonstration image area to a mark pattern coordinate in a demonstration image projected in the demonstration image area; and generating a mark pattern at a mapped coordinates in the demonstration image.

DETAILED DESCRIPTION OF THE EMBODIMENTS

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

Figure 1:
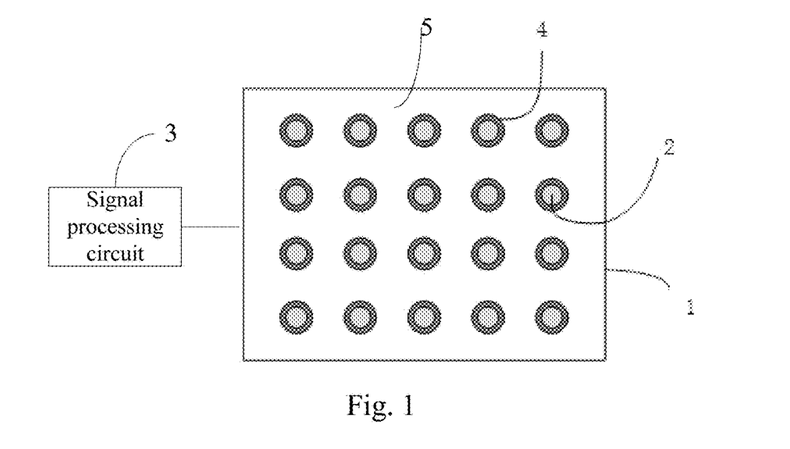
FIG. 1 is a schematic structural diagram of a projection screen according to some embodiments of the disclosure.

A projection screen according to the embodiments of the disclosure, as illustrated in FIG. 1, includes a screen curtain 1, photosensitive elements 2 and a signal processing circuit 3.

The photosensitive elements 2 are positioned on the screen curtain 1 and configured to generate position sensing signals.

Figure 2:
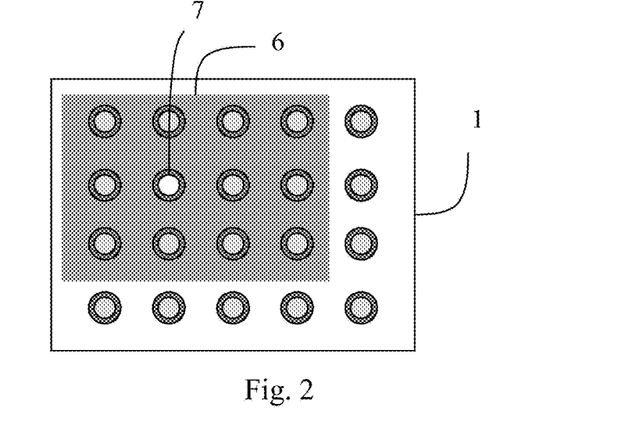
FIG. 2 is a schematic diagram of positions of a projection area and an indication point according to some embodiments of the disclosure.

The signal processing circuit 3 is electrically connected with the photosensitive elements 2 (where the electrical connection relationship is not illustrated in FIG. 1), and is configured to determine and output a relative position coordinate of an indication point in a projection area; where, as illustrated in FIG. 2, the projection area 6 is an area, illuminated by a light projection device, on the projection screen, and the indication point 7 is a projection point of a light indication device on the projection screen.

Optionally, in the above projection screen according to the embodiments of the disclosure, the light indication device is a laser pointer and the light projection device is a projector.

Specifically, in the above projection screen according to the embodiments of the disclosure, the screen curtain 1 is used for receiving illumination from the projection device. The photosensitive elements 2 may be located, for example, on a side, illuminated by the projection device, of the screen curtain 1 so that the photosensitive elements 2 can accurately convert a change of light intensity into electrical signals for output. Where a size of the screen curtain 1 and the number of the photosensitive elements 2 are not limited; the photosensitive elements 2 generate the position sensing signals after being illuminated by the light emitted from the projection device, and the positions where the position sensing signals are generated are the positions where the projection screen are illuminated by the projection device.

Optionally, in the above projection screen according to the embodiments of the disclosure, the photosensitive elements 2 are arranged on the screen curtain 1 in a matrix, and FIG. 1 only exemplarily illustrates an arrangement of the photosensitive elements 2 in 4 rows and 5 columns.

Optionally, in the above projection screen according to the embodiments of the disclosure, the photosensitive elements 2 are photosensitive diodes.

Optionally, in the above projection screen according to the embodiments of the disclosure, as illustrated in FIG. 1, the projection screen further includes silica gel layers 4, and the silica gel layers 4 are located between the photosensitive elements 2 and the screen curtain 1 to prevent the photosensitive elements 2 from degumming with the screen curtain 1.

Optionally, in the above projection screen according to the embodiments of the disclosure, as illustrated in FIG. 1, an insulating light-transmitting film 5 located at the same layer as the silica gel layers 4 is further provided, and the insulating light-transmitting film 5 is located among the silica gel layers 4. The insulating light-transmitting film 5 plays an insulating role.

Figure 3:
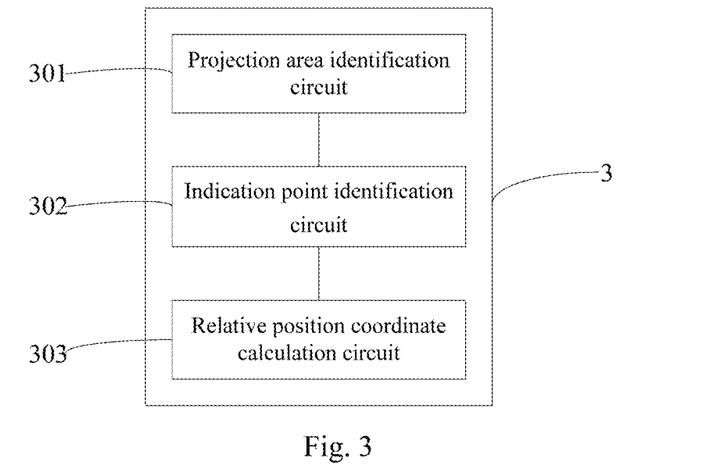
FIG. 3 is a schematic structural diagram of a signal processing circuit in a projection screen according to some embodiments of the disclosure.

Optionally, in the above projection screen according to the embodiments of the disclosure, as illustrated in FIG. 3, the signal processing circuit 3 includes a projection area identification circuit 301.

The projection area identification circuit 301 is configured to identify an area, where a photosensitive element 2 illuminated by the light projection device to generate a position sensing signal is located, as the projection area 6. That is, the projection area identification circuit 301 is configured to identify a position of the projection area 6 on the projection screen.

Specifically, in the above projection screen according to the embodiments of the disclosure, the photosensitive elements 2 on the screen curtain 1 can generate sensing signals after being illuminated by the light projection device, and the projection area identification circuit 301 identifies an area where a photosensitive element 2 illuminated by the projection light source is located as the projection area 6.

Figure 4:
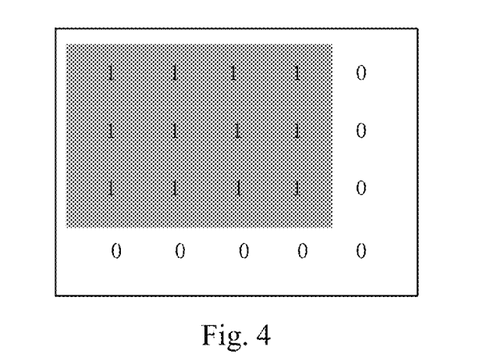
FIG. 4 is a schematic diagram of a photosensitive matrix according to some embodiments of the disclosure.

Optionally, in the above projection screen according to the embodiments of the disclosure, the photosensitive elements 2 are arranged in a regular matrix, and the projection area identification circuit 301 can generate a photosensitive matrix according to an illumination situation of the projection screen by the light projection device. As illustrated in FIG. 4, the photosensitive matrix corresponds to the matrix of the photosensitive elements 2, an element in the photosensitive matrix corresponding to a position of a photosensitive element 2 which is illuminated by the light projection device is numerically marked, for example, marked as 1, and an element in the photosensitive matrix corresponding to a position of a photosensitive element 2 not illuminated by the light projection device is numerically marked, for example, marked as 0, as long as a numerical value is different from a marked number of the position illuminated by the light projection device.

Figure 5:
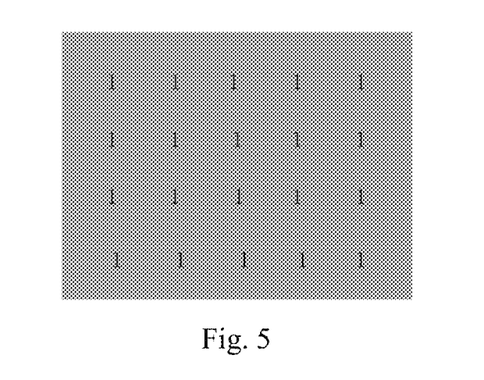
FIG. 5 is a schematic diagram of another photosensitive matrix according to some embodiments of the disclosure.

In a practical application, as illustrated in FIG. 5, there is a case where a size of the projection area 6 is the same as that of the screen curtain 1 and a description thereof is similar to the description described above, and thus will be omitted here.

Optionally, in the above projection screen according to the embodiments of the disclosure, as illustrated in FIG. 3, the signal processing circuit 3 further includes an indication point identification circuit 302.

The indication point identification circuit 302 is configured to: identify a change of electrical signals output by the photosensitive elements 2 and identify a position of a photosensitive element 2 on the projection screen with a light intensity value greater than a preset light intensity value as an absolute position of the indication point 7 on the projection screen. That is, the indication point identification circuit 302 is configured to identify the absolute position of the indication point 7 on the projection screen.

Specifically, in the above projection screen according to the embodiments of the disclosure, the light indication device illuminates the screen curtain 1, and the photosensitive elements 2 can generate position sensing signals after being illuminated by the light indication device. The indication point identification circuit 302 identifies the position of the photosensitive element 2 on the projection screen with a light intensity value greater than a preset light intensity value as an absolute position of the indication point 7 on the projection screen. The preset light intensity value is set in advance, and when a light intensity value at a certain position on the projection screen is greater than the preset light intensity value, the position is determined as the absolute position of the indication point 7 on the projection screen.

Specifically, in the above projection screen according to the embodiments of the disclosure, the indication point identification circuit 302 may scan each row and each column of the matrix of the photosensitive elements 2 of the projection screen respectively, to detect the change of electrical signals, such as a change in current or voltage, caused by a change in a resistance of a photosensitive element 2 located at a position illuminated by the light indication device, so as to determine the absolute position of the indication point 7 on the projection screen.

Specifically, in the above projection screen according to the embodiments of the disclosure, the indication point identification circuit 302 acquires the photosensitive matrix and converts a numerical mark of an element in the photosensitive matrix corresponding to the position of the indication point 7, for example, to 2.

For example, when laser pointer illumination does not occur at a certain position, the data of an image scanning line is 8 bit, then the data of the address is 0000, 0000, and when laser pointer illumination occurs at the position, the data of the address becomes 0000, 0000 plus a set data value of the laser pointer.

Specifically, in the above projection screen according to the embodiments of the disclosure, when the indication point 7 covers at least two photosensitive elements 2, the indication point identification circuit 302 can identify a point change of the photosensitive elements 2, such as a change in current or voltage, and identifies a position of a geometric center of at least two photosensitive elements 2 on the projection screen with a light intensity value greater than a maximum light intensity value in the projection area 6 as the position of the indication point 7.

Optionally, in the above projection screen according to the embodiments of the disclosure, as illustrated in FIG. 3, the signal processing circuit 3 further includes a relative position coordinate calculation circuit 303.

The relative position coordinate calculation circuit 303 is configured to calculate the relative position coordinate of the indication point 7 in the projection area 6 according to the absolute position of the indication point 7 and a position of the projection area 6. The relative position coordinate calculation circuit 303 is configured to determine the relative position coordinate of the indication point 7 in the projection area 6.

Optionally, in the above projection screen according to the embodiments of the disclosure, the relative position coordinate calculation circuit 303 is configured to calculate the relative position coordinate of the indication point 7 in the projection area 6 by numbering the photosensitive elements 2.

For example, the photosensitive elements 2 in the projection area 6 are arranged in a regular rectangle, the relative position coordinate calculation circuit 303 numbers the photosensitive elements 2 in the projection area 6, and determines a serial number of a photosensitive element 2 at a position where the indication point 7 is located. The relative position coordinate calculation circuit 303 calculates a proportion of the number of photosensitive elements 2 between the photosensitive element 2 at the position where the indication point 7 is located and a photosensitive element 2 in a first column of the same row in the projection area 6 (including the photosensitive element 2 at the position where the indication point 7 is located and the photosensitive element 2 in the first column of the same row in the projection area 6) to a total number of photosensitive elements 2 in the same row in the projection area 6, and further calculates a proportion of the number of photosensitive elements 2 between the photosensitive element 2 at the position where the indication point 7 is located and a photosensitive element 2 in a first row of the same column in the projection area 6 (including the photosensitive element 2 at the position where the indication point 7 is located and the photosensitive element 2 in the first row of the same column in the projection area 6) to a total number of photosensitive elements 2 in the same column in the projection area 6, so as to determine the absolute position coordinate of the indication point 7 in the projection area 6.

Specifically, as illustrated in FIG. 2, the photosensitive elements 2 are arranged on the projection screen in 4 rows and 5 columns, the projection area 6 identified by the projection area identification circuit 301 is an area where photosensitive elements 2 in the first, second and third rows and the first, second, third and fourth columns are located, and the position of the indication point 7 identified by the indication point identification circuit 302 is a position where a photosensitive element 2 in the second row and second column is located. Accordingly, the proportion of the number of photosensitive elements 2 between the photosensitive element 2 at the position where the indication point 7 is located and the photosensitive element 2 in the first column of the same row in the projection area 6 (including the photosensitive element 2 at the position where the indication point 7 is located and the photosensitive element 2 in the first column of the same row in the projection area 6) to the total number of photosensitive elements 2 in the same row in the projection area 6 is 2/5, and the proportion of the number of photosensitive elements 2 between the photosensitive element 2 at the position where the indication point 7 is located and the photosensitive element 2 in the first row of the same column in the projection area 6 (including the photosensitive element 2 at the position where the indication point 7 is located and the photosensitive element 2 in the first row of the same column in the projection area 6) to the total number of photosensitive elements 2 in the same column in the projection area 6 is 2/4, namely 1/2.

Optionally, in the above projection screen according to the embodiments of the disclosure, the relative position coordinate calculation circuit 303 may determine a position coordinate of an element subjected to numerical conversion among elements of the photosensitive matrix subjected to illumination of the light projection device, where a position coordinate of a photosensitive element 2 corresponding to said position is the relative position coordinate of the indication point 7 in the projection area 6.

Optionally, in the above projection screen according to the embodiments of the disclosure, the relative position coordinate calculation circuit 303 is specifically configured to determine the relative position coordinate of the indication point 7 in the projection area 6 by calculating a positional proportional relationship of the indication point 7 in the projection area 6.

For example, the projection area 6 is a regular rectangle, the relative position coordinate calculation circuit 303 calculates a proportion of a distance between a position of the indication point 7 and a left side edge of the projection area 6 to a distance between the left side edge and a right side edge of the projection area 6, and further calculates a proportion of a distance between the position of the indication point 7 and an upper side edge of the projection area 6 to a distance between the upper side edge and a lower side edge of the projection area 6, so as to determine the position coordinate of the indication point 7 in the projection area.

Figure 6:
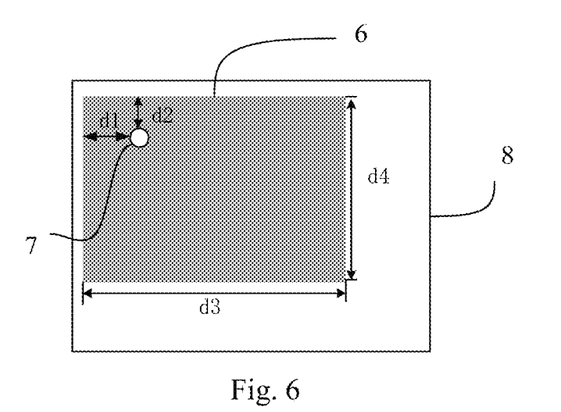
FIG. 6 is another schematic diagram of positions of a projection area and an indication point according to some embodiments of the disclosure.

Specifically, as illustrated in FIG. 6, the projection area 6 is a regular rectangle, the distance between the indication point 7 and the left side edge of the projection area 6 is d1, the distance between the indication point 7 and the upper side edge of the projection area 6 is d2, the distance between the left side edge and the right side edge of the projection area 6 is d3, and the distance between the upper side edge and the lower side edge of the projection area 6 is d4. Accordingly, the proportion of the distance between the position of the indication point 7 and the left side edge of the projection area 6 to the distance between the left side edge and the right side edge of the projection area 6 is d1/d3, and the proportion of the distance between the position of the indication point 7 and the upper side edge of the projection area 6 to the distance between the upper side edge and the lower side edge of the projection area 6 is d2/d4.

Optionally, in the above projection screen according to the embodiments of the disclosure, the projection area identification circuit 301 may include a first capturing component and a first image identification component.

The first capturing component is configured to capture the projection screen to obtain a projection screen picture 8, as illustrated in FIG. 6; and the first image identification component is configured to identify a position corresponding to the projection area 6 in the projection screen picture 8, that is, the first image identification component performs image processing on the obtained projection screen picture 8 and extracts the projection area 6 from the projection screen picture 8.

For example, the projection area 6 and a non-projection area on the projection screen picture 8 have different gray values, and an area with a larger gray value in the projection screen picture 8 is identified as the projection area 6 by means of edge extraction, image segmentation, etc.

Optionally, in the above projection screen according to the embodiments of the disclosure, the indication point identification circuit 302 may include a second capturing component and a second image identification component.

The second capturing component is configured to capture the projection screen to obtain a projection screen picture 8, as illustrated in FIG. 6; and the second image identification component is configured to identify a position in the projection screen picture 8 with a brightness value greater than a preset brightness value as the absolute position of the indication point 7 on the projection screen, that is, the second image identification component performs image processing on the obtained projection screen picture 8 and extracts the position of the indication point 7 from the projection screen picture 8.

For example, the position of the indication point 7 on the projection screen picture 8 and other positions in the projection screen picture 8 have different gray values, and the position of the indication point 7 should be a position with a gray value greater than a maximum gray value in the projection area 6. By means of edge extraction, image segmentation and other methods, the area in the projection screen picture 8 with the gray value greater than the maximum gray value in the projection area 6 is identified as the position of the indication point 7.

The first capturing component and the second capturing component may be arranged separately or may be realized by a same capturing component.

In a specific implementation, in the projection screen above according to the embodiments of the disclosure, the identification results of the photosensitive elements 2 and the identification results of the capturing components and the image identification components can be integrated so that the acquired relative position coordinate of the indication point 7 in the projection area 6 are more accurate. In addition, when the photosensitive elements 6 break down, it is also possible to acquire the relative position coordinate of the indication point 7 in the projection area 6 by the capturing components and the image identification components alone.

To sum up, the projection screen provided in the embodiments of the disclosure includes the screen curtain 1, the photosensitive elements 2 and the signal processing circuit 3. The position of the projection area 6 is identified by the projection area identification circuit 301, the absolute position of the indication point 7 in the projection screen is identified by the indication point identification circuit 302, and the relative position coordinate of the indication point 7 in the projection area 6 is determined by the relative position coordinate calculation circuit 303. Therefore, the projection screen can receive the illumination of a projection device and determine a relative position coordinate of a projection point of a light indication device on the projection screen in an area illuminated by the light projection device, that is, the position coordinate of the indication point 7 in the projection area 6.

Figure 7:
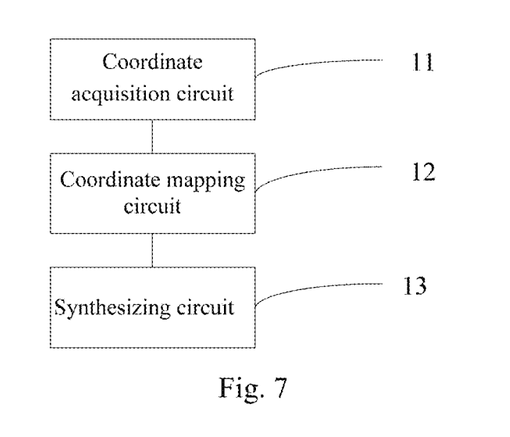
FIG. 7 is a schematic structural diagram of an image synthesizing device according to some embodiments of the disclosure.

Based upon the same inventive concept, the embodiments of the disclosure further provide an image synthesizing device, as illustrated in FIG. 7, including: a coordinate acquisition circuit 11, a coordinate mapping circuit 12 and a synthesizing circuit 13.

Where the coordinate acquisition circuit 11 is configured to acquire a position coordinate, in a demonstration image area, of an indication point 7 for indication in the demonstration image area; the coordinate mapping circuit 12 is configured to map the position coordinate of the indication point 7 in the demonstration image area to a mark pattern coordinate in a demonstration image projected in the demonstration image area; and the synthesizing circuit 13 is configured to generate a mark pattern at the mapped coordinate in the demonstration image.

Specifically, the demonstration image may be a static image or a dynamic image, which will not be limited herein.

Specifically, the coordinate mapping circuit 12 may determine, according to a proportion of the number of photosensitive elements 2 between a photosensitive element 2 at a position where the indication point 7 is located and a photosensitive element 2 in the first column of the same row in the projection area 6 (including the photosensitive element 2 at the position where the indication point 7 is located and the photosensitive element 2 in the first column of the same row in the projection area 6) to a total number of photosensitive elements 2 in the same row in the projection area 6, an area in the demonstration image of which a proportion of a distance between the area and a left side edge of the demonstration image to a distance between the left side edge and a right side edge of the demonstration image is the same, and determine, according to a proportion of the number of photosensitive elements 2 between the photosensitive element 2 at the position where the indication point 7 is located and a photosensitive element 2 in the first row of the same column in the projection area 6 (including the photosensitive element 2 at the position where the indication point 7 is located and the photosensitive element 2 in the first row of the same column in the projection area 6) to a total number of photosensitive elements 2 in the same column in the projection area 6, an area in the demonstration image of which a proportion of a distance between the area and an upper side edge of the demonstration image to a distance between the upper side edge and a lower side edge of the demonstration image is the same, where a coordinate of a coincident position of the two areas is the position coordinate of the indication point 7 in the demonstration image after mapping.

Figure 8:
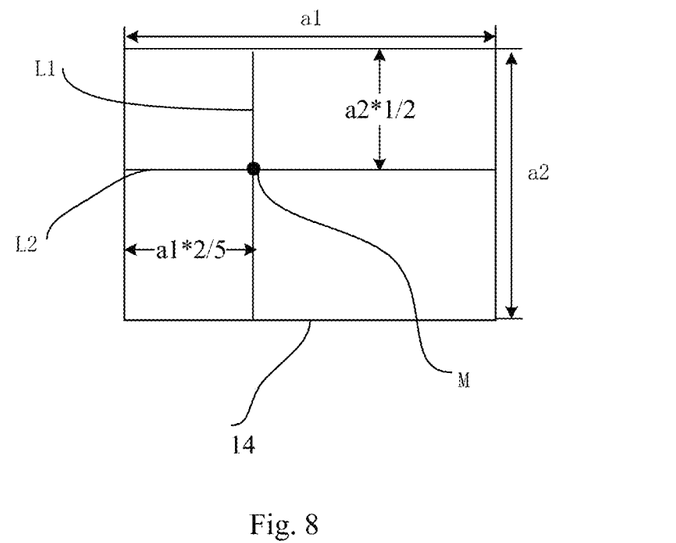
FIG. 8 is a schematic diagram of a demonstrated image according to some embodiments of the disclosure.

Specifically, as illustrated in FIG. 8, the distance from the left side edge to the right side edge of the demonstration image 14 is a1, the distance from the upper side edge to the lower side edge of the demonstration image 14 is a2, if the proportion of the number of photosensitive elements 2 between the photosensitive element 2 at the position where the indication point 7 is located and the photosensitive element 2 in the first column of the same row in the projection area 6 (including the photosensitive element 2 at the position where the indication point 7 is located and the photosensitive element 2 in the first column of the same row in the projection area 6) to the total number of photosensitive elements 2 in the same row in the projection area 6 is 2/5, an area in the demonstration image 14 which is a1*2/5 away from the left side edge of the demonstration image 14 is L1; and if the proportion of the number of photosensitive elements 2 between the photosensitive element 2 at the position where the indication point 7 is located and the photosensitive element 2 in the first row of the same column in the projection area 6 (including the photosensitive element 2 at the position where the indication point 7 is located and the photosensitive element 2 in the first row of the same column in the projection area 6) to the total number of photosensitive elements 2 in the same column in the projection area 6 is 1/2, an area in the demonstration image 14 which is a2*1/2 away from the upper side edge of the demonstration image 14 is L2, and a coordinate of a coincident area M of areas L1 and L2 is the position coordinate of the indication point 7 in the demonstration image 14 after mapping. The synthesizing circuit 13 generates a mark pattern at the position coordinate M in the demonstration image 14.

Specifically, the coordinate mapping circuit 12 determines, according to a proportion of a distance between a position where the indication point 7 is located and a left side edge of the projection area 6 to a distance between the left side edge and a right side edge of the projection area 6, an area in the demonstration image 14 of which a proportion of a distance between the area and the left side edge of the demonstration image 14 to the distance between the left side edge and the right side edge of the demonstration image 14 is the same; and determines, according to a proportion of a distance between the position where the indication point 7 is located and an upper side edge of the projection area 6 to a distance between the upper side edge and a lower side edge of the projection area 6, an area in the demonstration image 14 of which a proportion of a distance between the area and the upper side edge of the demonstration image 14 to the distance between the upper side edge and the lower side edge of the demonstration image 14 is the same, where a coordinate of a coincident position of the two areas is the position coordinate of the indication point 7 in the demonstration image 14 after mapping. The synthesizing circuit generates a mark pattern at the position coordinate in the demonstration image.

Figure 9:
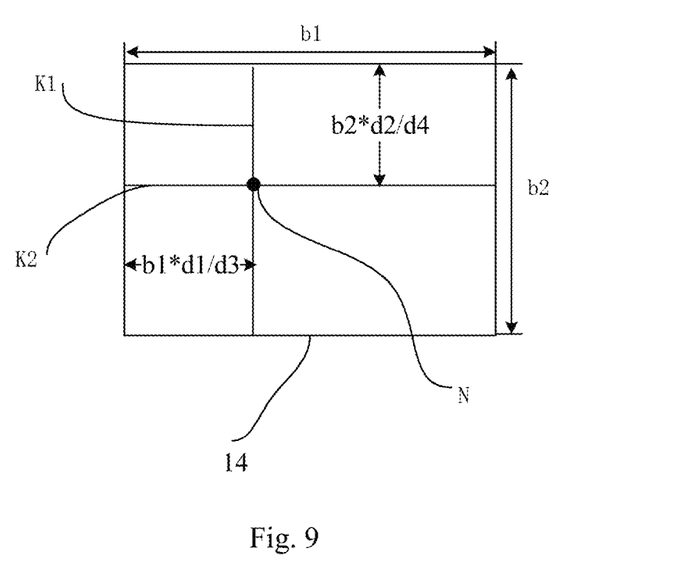
FIG. 9 is a schematic diagram of another demonstrated image according to some embodiments of the disclosure.

Specifically, as illustrated in FIG. 9, the distance from the left side edge to the right side edge of the demonstration image 14 is b1, the distance from the upper side edge to the lower side edge of the demonstration image 14 is b2, if the proportion of the distance between the position where the indication point 7 is located and the left side edge of the projection area 6 to the distance between the left side edge and the right side edge of the projection area 6 is d1/d3, an area in the demonstration image 14 which is b1*d1/d3 away from the left side edge of the demonstration image 14 is K1; and if the proportion of the distance between the position where the indication point 7 is located and the upper side edge of the projection area 6 to the distance between the upper side edge and the lower side edge of the projection area 6 is d2/d4, an area in the demonstration image 14 which is b2*d2/d4 away from the upper side edge of the demonstration image 14 is K2, and a coordinate of a coincident area N of areas K1 and K2 is the position coordinate of the indication point 7 in the demonstration image 14 after mapping. The synthesizing circuit 13 generates a mark pattern at the position coordinate N in the demonstration image 14.

Optionally, the mark pattern may be a special shape such as a solid circle or triangle, or may be a symbol with a special color.

Optionally, in the image synthesizing device according to the embodiments of the disclosure, a mark adjustment circuit is further provided, and the mark adjustment circuit is configured to adjust the shape, color and/or size of the mark pattern as needed.

The image synthesizing device according to the embodiments of the disclosure includes the coordinate acquisition circuit 11, the coordinate mapping circuit 12 and the synthesizing circuit 13, where the coordinate acquisition circuit 11 is configured to acquire the position coordinate, in the demonstration image area 14, of the indication point 7 for indication in the demonstration image area 14, the coordinate mapping circuit 12 is configured to map the position coordinate of the indication point 7 in the demonstration image area 14 to a mark pattern coordinate in the demonstration image projected in the demonstration image area 14, and the synthesizing circuit 13 is configured to generate the mark pattern at the mapped coordinate in the demonstration image. Therefore, the image synthesizing device can calculate a coordinate of the indication point in the demonstration image and generate a mark pattern at the coordinate.

Figure 10:
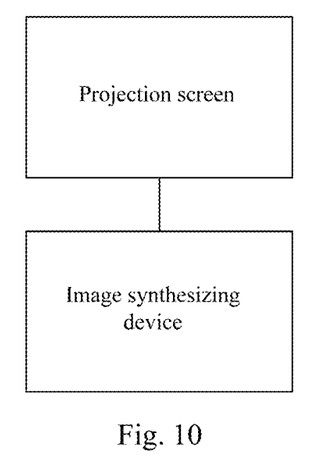
FIG. 10 is a schematic structural diagram of a projection system according to some embodiments of the disclosure.

Based upon the same inventive concept, the embodiments of the disclosure further provide a projection system, as illustrated in FIG. 10, including the projection screen above according to the embodiments of the disclosure and an image synthesizing device.

Where a signal processing circuit in the projection screen is configured to output a position coordinate of an indication point 7 in a projection area 6 to the image synthesizing device.

The image synthesizing device includes: a coordinate acquisition circuit configured to acquire a relative position coordinate, in a demonstration image area, of the indication point for indication in the demonstration image area; a coordinate mapping circuit configured to map the relative position coordinate of the indication point in the demonstration image area to a mark pattern coordinate in a demonstration image projected in the demonstration image area; and a synthesizing circuit configured to generate a mark pattern at the mapped coordinate in the demonstration image.

Alternatively, based upon the same inventive concept, the embodiments of the disclosure further provide a projection system, as illustrated in FIG. 10, including the image synthesizing device above according to the embodiments of the disclosure and a projection screen.

Where the projection screen includes: a screen curtain; photosensitive elements, positioned on the screen curtain and configured to generate position sensing signals; and a signal processing circuit, electrically connected with the photosensitive elements and configured to determine a relative position coordinate of an indication point in a projection area and output the same to the image synthesizing device; where the projection area is an area, illuminated by a light projection device, on the projection screen; and the indication point is a projection point of a light indication device on the projection screen.

According to the projection system provided by the embodiments of the disclosure, the relative position coordinate of the indication point 7 in the projection area 6 is determined and output to the image synthesizing device by the projection screen, and the image synthesizing device maps the coordinate to the coordinate in the demonstration image and generates the mark pattern at the mapped coordinate in the demonstration image. According to the embodiments of the disclosure, when multi-screen projection is performed, after the mark pattern is generated on the demonstration image, by indicating one projection screen with a light indication device, the mark pattern can also be displayed on other projection screens.

Figure 11:
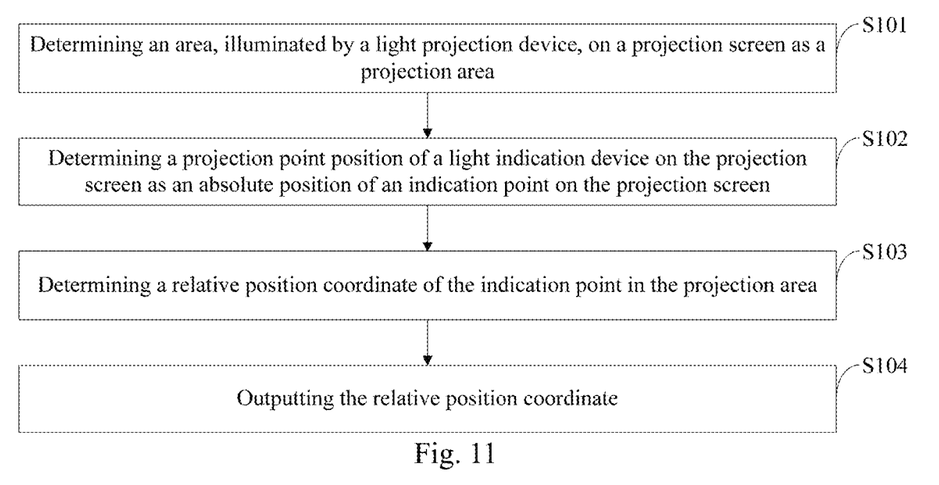
FIG. 11 is a schematic diagram of a method for determining a coordinate according to some embodiments of the disclosure.

Based upon the same inventive concept, the embodiments of the disclosure further provide a coordinate determining method, as illustrated in FIG. 11, which includes following operations.

S101, determining an area, illuminated by a light projection device, on a projection screen as a projection area. Specifically, an area where a photosensitive element illuminated by the light projection device to generate a position sensing signal is located can be identified as the projection area; alternatively, the projection screen may be captured by using a capturing component to obtain a picture of the projection screen and identify a position corresponding to the projection area in the picture.

S102, determining a projection point position of a light indication device on the projection screen as an absolute position of an indication point on the projection screen. Specifically, a position of a photosensitive element on the projection screen with a light intensity value greater than a maximum light intensity value of the projection area can be identified as the absolute position of the indication point; alternatively, a position in the picture with a brightness value greater than a maximum brightness value of the projection area is identified as the absolute position of the indication point.

S103, determining a relative position coordinate of the indication point in the projection area. Specifically, the relative position coordinate of the indication point in the projection area can be calculated by numbering the photosensitive elements; alternatively, the relative position coordinate of the indication point in the projection area can be determined by calculating a positional proportional relationship of the indication point in the projection area.

S104, outputting the relative position coordinate.

Optionally, in the above coordinate determining method according to the embodiments of the disclosure, before the operation S102, the method may further include: judging regularly whether a laser pointer illuminates the projection screen, if so, performing the operation S102.

Figure 12:
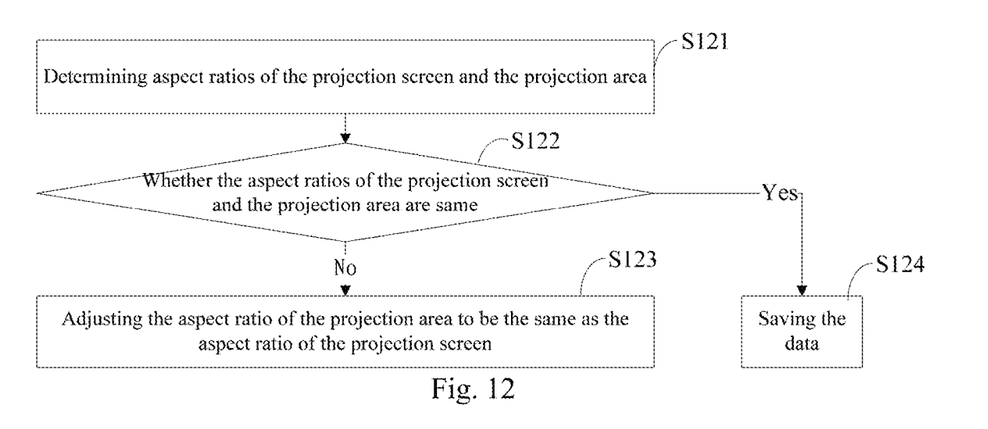
FIG. 12 is a schematic diagram of adjusting a size of a projection area according to a size of a projection screen according to some embodiments of the disclosure.

Optionally, in the above coordinate determining method according to the embodiments of the disclosure, the operation S101 may further include: adjusting a size of the projection area according to a size of the projection screen. Specifically, as illustrated in FIG. 12, this may further include following operations.

S121, determining aspect ratios of the projection screen and the projection area.

S122, determining whether the aspect ratios of the projection screen and the projection area are same; if the aspect ratios are same, performing the operation S124; and if not, performing the operation S123.

S123, adjusting the aspect ratio of the projection area to be the same as the aspect ratio of the projection screen.

S124, saving the data.

Figure 13:
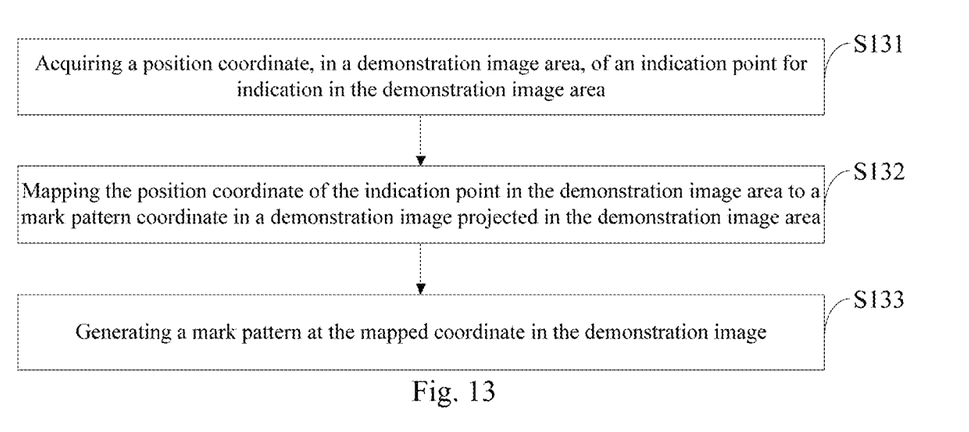
FIG. 13 is a schematic diagram of a method for synthesizing an image according to some embodiments of the disclosure.

Based upon the same inventive concept, the embodiments of the disclosure further provide an image synthesizing method, as illustrated in FIG. 13, which includes following operations.

S131, acquiring a position coordinate, in a demonstration image area, of an indication point for indication in the demonstration image area.

S132, mapping the position coordinate of the indication point in the demonstration image area to a mark pattern coordinate in a demonstration image projected in the demonstration image area.

S133, generating a mark pattern at the mapped coordinate in the demonstration image.

Based upon the same inventive concept, the embodiments of the disclosure further provide a projection method, including: determining, via the coordinate determining method above according to the embodiments of the disclosure, a relative position coordinate of an indication point in a projection area; generating a mark pattern at a mapped coordinate in a demonstration image according to the coordinate and the image synthesizing method above according to the embodiments of the disclosure; and displaying an image with the mark pattern.

Specifically, the embodiments of the disclosure provide a projection method including following operations.

Determining an area, illuminated by a light projection device, on a projection screen as a projection area; determining a projection point position of a light indication device on the projection screen as an absolute position of an indication point on the projection screen; determining a relative position coordinate of the indication point in the projection area; outputting the relative position coordinate; acquiring a position coordinate, in a demonstration image area, of the indication point for indication in the demonstration image area; mapping the position coordinate of the indication point in the demonstration image area to a mark pattern coordinate in a demonstration image projected in the demonstration image area; and generating a mark pattern at the mapped coordinate in the demonstration image.

Figure 14:
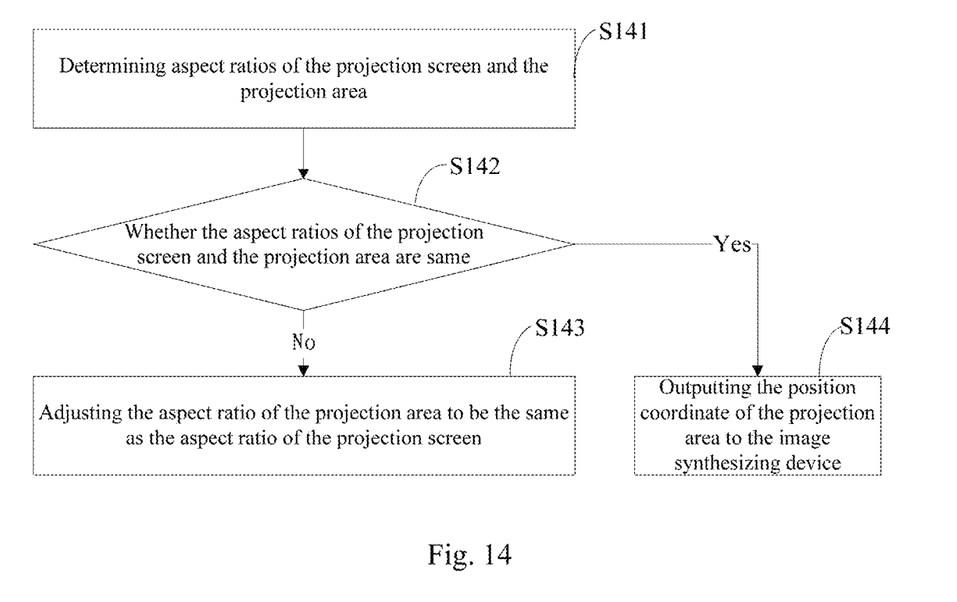
FIG. 14 is a schematic diagram of a method for determining aspect ratios of a projection screen and a projection area according to some embodiments of the disclosure.

Optionally, the position coordinate of the indication point in the projection area is determined and output to the image synthesizing device; and mapping of the position coordinate can be realized based on a quantitative proportional relationship of the photosensitive elements or a positional proportional relationship of the indication point in the projection area. As illustrated in FIG. 14, the method may further include following operations.

S141, determining aspect ratios of the projection screen and the projection area.

S142, determining whether the aspect ratios of the projection screen and the projection area are same; if so, performing the operation S144; and if not, performing the operation S143.

S143, adjusting the aspect ratio of the projection area to be the same as the aspect ratio of the projection screen.

S144, outputting the position coordinate of the projection area to the image synthesizing device.

Optionally, the projection method according to the embodiments of the disclosure may further include: displaying a projected image with a projection mark on a plurality of projection screens connected with the image synthesizing device.

When projection is conducted with the above projection method, by indicating one projection screen with a projection pen, the indication point can also be displayed on other projection screens.

The above embodiments are only preferred embodiments of the disclosure and are not intended to limit the disclosure. Any modifications, equivalent substitutions, improvements, etc. made without departing from the spirit and principle of the disclosure should also be included within the scope of the disclosure.

The invention claimed is:

1. A projection screen, comprising:
 a screen curtain;
 photosensitive elements, positioned on the screen curtain and configured to generate position sensing signals; and
 a signal processing circuit, electrically connected with the photosensitive elements and configured to determine and output a relative position coordinate of an indication point in a projection area;
 wherein the projection area is an area, illuminated by a light projection device, on the projection screen; and the indication point is a projection point of a light indication device on the projection screen;
 wherein the signal processing circuit comprises an indication point identification circuit; and
 the indication point identification circuit is configured to identify a change of electrical signals output by the photosensitive elements and identify a position of at least one of the photosensitive elements on the projection screen with a light intensity value greater than a preset light intensity value as an absolute position of the indication point on the projection screen.

2. The projection screen according to claim 1, wherein the signal processing circuit comprises a projection area identification circuit; and
 the projection area identification circuit is configured to identify an area, where part of the photosensitive elements illuminated by the light projection device to generate a position sensing signal is located, as the projection area.

3. The projection screen according to claim 2, wherein the projection area identification circuit comprises a first capturing component and a first image identification component;
the first capturing component is configured to capture the projection screen to obtain a projection screen picture; and
the first image identification component is configured to identify a position corresponding to the projection area in the projection screen picture.

4. The projection screen according to claim 1, further comprising silica gel layers located between the photosensitive elements and the screen curtain.

5. The projection screen according to claim 4, further comprising an insulating light-transmitting film located at a same film layer as the silica gel layers; and the insulating light-transmitting film is located among the silica gel layers.

6. A projection system, comprising the projection screen according to claim 1, and an image synthesizing device, wherein:
the signal processing circuit in the projection screen is configured to output the relative position coordinate of the indication point in the projection area to the image synthesizing device;
the image synthesizing device comprises:
a coordinate acquisition circuit configured to acquire a relative position coordinate, in a demonstration image area, of the indication point for indication in the demonstration image area;
a coordinate mapping circuit configured to map the relative position coordinate of the indication point in the demonstration image area to mark a pattern coordinate in a demonstration image projected in the demonstration image area; and
a synthesizing circuit configured to generate a mark pattern at a mapped coordinate in the demonstration image.

7. An image synthesizing device, comprising:
a coordinate acquisition circuit configured to acquire a relative position coordinate, in a demonstration image area, of an indication point for indication in the demonstration image area;
a coordinate mapping circuit configured to map the relative position coordinate of the indication point in the demonstration image area to a mark pattern coordinate in a demonstration image projected in the demonstration image area; and
a synthesizing circuit configured to generate a mark pattern at a mapped coordinate in the demonstration image;
wherein the coordinate mapping circuit is configured to:
determine, according to a proportion of a distance between a position where the indication point is located and a left side edge of a projection area to a distance between the left side edge and a right side edge of the projection area, an area in the demonstration image of which a proportion of a distance between the area and the left side edge of the demonstration image to the distance between the left side edge and the right side edge of the demonstration image is same; and
determine, according to a proportion of a distance between the position where the indication point is located and an upper side edge of the projection area to a distance between the upper side edge and a lower side edge of the projection area, an area in the demonstration image of which a proportion of a distance between the area and the upper side edge of the demonstration image to the distance between the upper side edge and the lower side edge of the demonstration image is same;
wherein a coordinate of a coincident position of the two areas is a position coordinate of the indication point in the demonstration image after mapping.

8. The image synthesizing device according to claim 7, further comprising a mark adjustment circuit, wherein the mark adjustment circuit is configured to adjust at least one of a shape, a color or a size of the mark pattern.

9. A projection system, comprising the image synthesizing device according to claim 7, and a projection screen, wherein:
the projection screen comprises:
a screen curtain;
photosensitive elements, positioned on the screen curtain and configured to generate position sensing signals; and
a signal processing circuit, electrically connected with the photosensitive elements and configured to determine a relative position coordinate of an indication point in a projection area and output the same to the image synthesizing device;
wherein the projection area is an area, illuminated by a light projection device, on the projection screen; the indication point is a projection point of a light indication device on the projection screen.

10. The projection screen according to claim 9, wherein the indication point identification circuit comprises a second capturing component and a second image identification component;
the second capturing component is configured to capture the projection screen to obtain a projection screen picture; and
the second image identification component is configured to identify a position in the projection screen picture with a brightness value greater than a preset brightness value as the absolute position of the indication point on the projection screen.

11. The projection screen according to claim 9, wherein the signal processing circuit further comprises a relative position coordinate calculation circuit; and
the relative position coordinate calculation circuit is configured to calculate the relative position coordinate of the indication point in the projection area according to the absolute position of the indication point and a position of the projection area.

12. The projection screen according to claim 11, wherein the relative position coordinate calculation circuit is configured to calculate the relative position coordinate of the indication point in the projection area by numbering the photosensitive elements.

13. The projection screen according to claim 11, wherein the relative position coordinate calculation circuit is configured to determine the relative position coordinate of the indication point in the projection area by calculating a positional proportional relationship of the indication point in the projection area.

14. The image synthesizing device according to claim 7, wherein the coordinate mapping circuit is configured to:
determine, according to a proportion of a number of photosensitive elements between a photosensitive element at a position where the indication point is located and a photosensitive element in a first column of a same row in a projection area to a total number of photosensitive elements in the same row in the projection area, an area in the demonstration image of which a proportion of a distance between the area and a left side edge of the demonstration image to a distance between the left side edge and a right side edge of the demonstration image is same; and determine, according to a proportion of a number of photosensitive elements between the photosensitive element at the position where the indication point is located and a photosensitive element in a first row of a same column in the projection area to a total number of photosensitive elements in the same column in the projection area, an area in the demonstration image of which a proportion of a distance between the area and an upper side edge of the demonstration image to a distance between the upper side edge and a lower side edge of the demonstration image is same;

wherein a coordinate of a coincident position of the two areas is a position coordinate of the indication point in the demonstration image after mapping.

15. The image synthesizing device according to claim 7, wherein a shape of the mark pattern is a solid circle, a triangle, or a symbol with a special color.

16. A projection screen, comprising:
one or more processors;
a memory; and
one or more application programs, wherein the one or more application programs are stored in the memory and configured to be executed by the one or more processors, and the one or more programs are configured to:
determine an area, illuminated by a light projection device, on the projection screen as a projection area;
determine a projection point position of a light indication device on the projection screen as an absolute position of an indication point on the projection screen;
determine a relative position coordinate of the indication point in the projection area; and
output the relative position coordinate;
wherein the one or more programs are further configured to:
identify a change of electrical signals output by the photosensitive elements and identify a position of at least one of the photosensitive elements on the projection screen with a light intensity value greater than a preset light intensity value as an absolute position of the indication point on the projection screen.

17. An image synthesizing device, comprising:
one or more processors;
a memory; and
one or more application programs, wherein the one or more application programs are stored in the memory and configured to be executed by the one or more processors, and the one or more programs are configured to:

acquire a position coordinate, in a demonstration image area, of an indication point for indication in the demonstration image area;
map the position coordinate of the indication point in the demonstration image area to a mark pattern coordinate in a demonstration image projected in the demonstration image area; and
generate the mark pattern at the mapped coordinate in the demonstration image;
wherein the coordinate mapping circuit is configured to:
determine, according to a proportion of a distance between a position where the indication point is located and a left side edge of a projection area to a distance between the left side edge and a right side edge of the projection area, an area in the demonstration image of which a proportion of a distance between the area and the left side edge of the demonstration image to the distance between the left side edge and the right side edge of the demonstration image is same; and
determine, according to a proportion of a distance between the position where the indication point is located and an upper side edge of the projection area to a distance between the upper side edge and a lower side edge of the projection area, an area in the demonstration image of which a proportion of a distance between the area and the upper side edge of the demonstration image to the distance between the upper side edge and the lower side edge of the demonstration image is same;
wherein a coordinate of a coincident position of the two areas is a position coordinate of the indication point in the demonstration image after mapping.

18. A projection method, comprising:
determining an area, illuminated by a light projection device, on a projection screen as a projection area;
determining a projection point position of a light indication device on the projection screen as an absolute position of an indication point on the projection screen; wherein the absolute position of the indication point on the projection screen is a position of at least one of the photosensitive elements on the projection screen with a light intensity value greater than a preset light intensity value;
determining a relative position coordinate of the indication point in the projection area;
outputting the relative position coordinate;
acquiring a position coordinate, in a demonstration image area, of the indication point for indication in the demonstration image area;
mapping the position coordinate of the indication point in the demonstration image area to a mark pattern coordinate in a demonstration image projected in the demonstration image area; and
generating a mark pattern at a mapped coordinate in the demonstration image.

* * * * *